US011144052B2

(12) United States Patent
Stent

(10) Patent No.: US 11,144,052 B2
(45) Date of Patent: Oct. 12, 2021

(54) READINESS AND IDENTIFICATION BY GAZE AND/OR GESTURE PATTERN DETECTION

(71) Applicant: Toyota Research Institute, Inc., Los Altos, CA (US)

(72) Inventor: Simon A. I. Stent, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 235 days.

(21) Appl. No.: 16/212,785

(22) Filed: Dec. 7, 2018

(65) Prior Publication Data

US 2020/0183383 A1 Jun. 11, 2020

(51) Int. Cl.
*B60W 50/08* (2020.01)
*B60W 40/08* (2012.01)
(Continued)

(52) U.S. Cl.
CPC .......... *G05D 1/0061* (2013.01); *B60W 40/08* (2013.01); *B60W 50/082* (2013.01);
(Continued)

(58) Field of Classification Search
CPC ......... G05D 1/0061; G05D 2201/0213; G05D 1/0088; G05D 1/0231; G05D 1/0278; B60W 60/0053; B60W 60/0059; B60W 50/082; B60W 40/08; B60W 2540/229; B60W 2540/225; B60W 2556/50; B60W 2540/00; B60W 2900/00; B60W 2420/42;
(Continued)

(56) References Cited

U.S. PATENT DOCUMENTS 6,974,326 B2 12/2005 Marple-Horvat
9,164,580 B2 10/2015 Katz
(Continued)

FOREIGN PATENT DOCUMENTS

CN 107719303 A 2/2018
CN 108364377 A 8/2018
(Continued)

*Primary Examiner* — Nadeem Odeh
(74) *Attorney, Agent, or Firm* — Dinsmore & Shohl, LLP

(57) ABSTRACT

A vehicle control handoff system includes a controller comprising a processor and a non-transitory computer readable memory, one or more environment sensors and an imaging device communicatively coupled to the controller, and a machine-readable instruction set stored in the non-transitory computer readable memory of the controller. The machine-readable instruction set causes the system to: receive image data from at least one imaging device, receive one or more signals corresponding to an environment of a vehicle from the one or more environment sensors, define a gaze pattern comprising a first gaze direction corresponding to a first location within the environment of the vehicle, determine a first gaze based on the image data of the driver, determine whether the first gaze corresponds to at least one gaze direction of the gaze pattern, and transfer control of a vehicle operation from control by the controller to the driver in response to determining that the first gaze corresponds to the gaze pattern.

18 Claims, 5 Drawing Sheets

(51) Int. Cl.

| | |
|---|---|
| ***B60W 60/00*** | (2020.01) |
| ***G05D 1/00*** | (2006.01) |
| ***G06F 3/01*** | (2006.01) |
| ***G06K 9/00*** | (2006.01) |
| *G05D 1/02* | (2020.01) |

(52) U.S. Cl.

CPC .... *B60W 60/0053* (2020.02); *B60W 60/0059* (2020.02); *G05D 1/0088* (2013.01); *G06F 3/013* (2013.01); *G06K 9/00832* (2013.01); *B60W 2420/42* (2013.01); *B60W 2420/52* (2013.01); *B60W 2540/00* (2013.01); *B60W 2540/225* (2020.02); *B60W 2540/229* (2020.02); *B60W 2556/50* (2020.02); *B60W 2900/00* (2013.01); *G05D 1/0231* (2013.01); *G05D 1/0278* (2013.01); *G05D 2201/0213* (2013.01)

(58) Field of Classification Search

CPC ........... B60W 2420/52; G06K 9/00832; G06F 3/017; G06F 3/013

USPC ............................................................ 701/23

See application file for complete search history.

(56) References Cited

U.S. PATENT DOCUMENTS

| | | | | |
|---|---|---|---|---|
| 9,235,211 | B2 | 1/2016 | Davidsson et al. | |
| 9,783,202 | B2 | 10/2017 | Yamada | |
| 9,886,237 | B2 | 2/2018 | Suzuki et al. | |
| 2012/0278766 | A1 | 11/2012 | Massengill | |
| 2016/0209840 | A1* | 7/2016 | Kim | G05D 1/0061 |
| 2016/0231812 | A1 | 8/2016 | Hansen et al. | |
| 2016/0370801 | A1* | 12/2016 | Fairfield | G05D 1/0038 |
| 2017/0088165 | A1* | 3/2017 | Raphael | B62D 6/001 |
| 2018/0086339 | A1* | 3/2018 | Hanna | G06K 9/00845 |
| 2020/0004244 | A1* | 1/2020 | Mangal | B60W 60/0053 |
| 2020/0139992 | A1* | 5/2020 | Oba | B60W 50/14 |
| 2020/0231182 | A1* | 7/2020 | Oba | B60W 40/09 |
| 2020/0241824 | A1* | 7/2020 | Lee | G10L 15/22 |

FOREIGN PATENT DOCUMENTS

| | | | |
|---|---|---|---|
| EP | 3330148 | A1 | 6/2018 |
| JP | 2009234318 | A | 10/2009 |
| JP | 2018022310 | A | 2/2018 |
| JP | 2018103670 | A | 7/2018 |
| WO | 2018150677 | A1 | 8/2018 |

* cited by examiner

READINESS AND IDENTIFICATION BY GAZE AND/OR GESTURE PATTERN DETECTION

TECHNICAL FIELD

The present specification generally relates to systems and methods for vehicle control handoff. More specifically, the present specification relates to systems and methods for verifying the readiness of a driver and handing off control of a vehicle to the driver.

BACKGROUND

Autonomous vehicles have varying levels of autonomous control. Some vehicles include automated systems that issue warnings and momentarily intervene but do not remain in control. Other vehicles may include autonomous systems such as automated braking, acceleration, and/or steering but a driver must maintain responsiveness to monitor vehicle actions. More advanced levels of autonomy may include systems which allow drivers to take their eyes off the road during particular stretches of a drive, and may hand back control to the driver for other portions of a drive. Currently, these systems may provide warnings or alerts to bring a driver's attention back to the driving environment and alert the driver of the need to retake control. However, confirmation of a driver's alertness and/or readiness in regaining control cannot be confirmed through the presentation of alerts. Furthermore, various aspects of an environment may include dynamic features or events that a driver who is in the process of regaining control of the vehicle may need to be aware of.

SUMMARY

In one embodiment, a vehicle control handoff system includes a controller comprising a processor and a non-transitory computer readable memory, one or more environment sensors communicatively coupled to the controller, an imaging device communicatively coupled to the controller, and a machine-readable instruction set stored in the non-transitory computer readable memory of the controller. The machine-readable instruction set causes the system to perform at least the following when executed by the processor: receive image data of a driver from at least one imaging device, receive one or more signals corresponding to an environment of a vehicle from the one or more environment sensors, define a gaze pattern comprising a first gaze direction corresponding to a first location within the environment of the vehicle, determine a first gaze based on the image data of the driver, determine whether the first gaze corresponds to at least one gaze direction of the gaze pattern, and transfer control of a vehicle operation from control by the controller to the driver in response to determining that the first gaze corresponds to the gaze pattern.

In some embodiments, a method of vehicle control handoff includes receiving image data of a driver from at least one imaging device, receiving one or more signals corresponding to an environment of a vehicle from one or more environment sensors and defining a gaze pattern comprising a first gaze direction corresponding to a first location within the environment of the vehicle based on the one or more signals. The method may further include determining a first gaze based on the image data of the driver, determining whether the first gaze corresponds to at least one gaze direction of the gaze pattern, and transferring control of a vehicle operation from control by a controller to the driver in response to determining that the first gaze corresponds to the gaze pattern.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein relate to systems and methods for verifying the readiness of a driver and handing off control of a vehicle to the driver. Particular embodiments of the present disclosure more specifically describe systems and methods that utilize gaze and gesture detection and pattern recognition and/or identification of features or events within a current environment to verify the readiness of a driver to receive control of a vehicle. For example, a driver may be required to gaze or gesture to one or more areas of interest defined by the vehicle based on the vehicle's present surroundings before the vehicle initially provides or returns control of a vehicle over to a driver.

Autonomous vehicles have varying levels of autonomous control. Some vehicles include automated systems that issue warnings and momentarily intervene but do not remain in control. Other vehicles may include autonomous systems such as automated braking, acceleration, and/or steering but a driver must maintain responsiveness to monitor vehicle actions. More advanced levels of autonomy may include systems, which allow drivers to take their eyes off the road during particular stretches of a drive, and may hand back control for other portions of a drive. Embodiments of the present disclosure provide systems and methods, which, for example, may provide the handoff of control from an autonomous system to a driver with verification that the driver is ready and aware to assume control.

Figure 1:
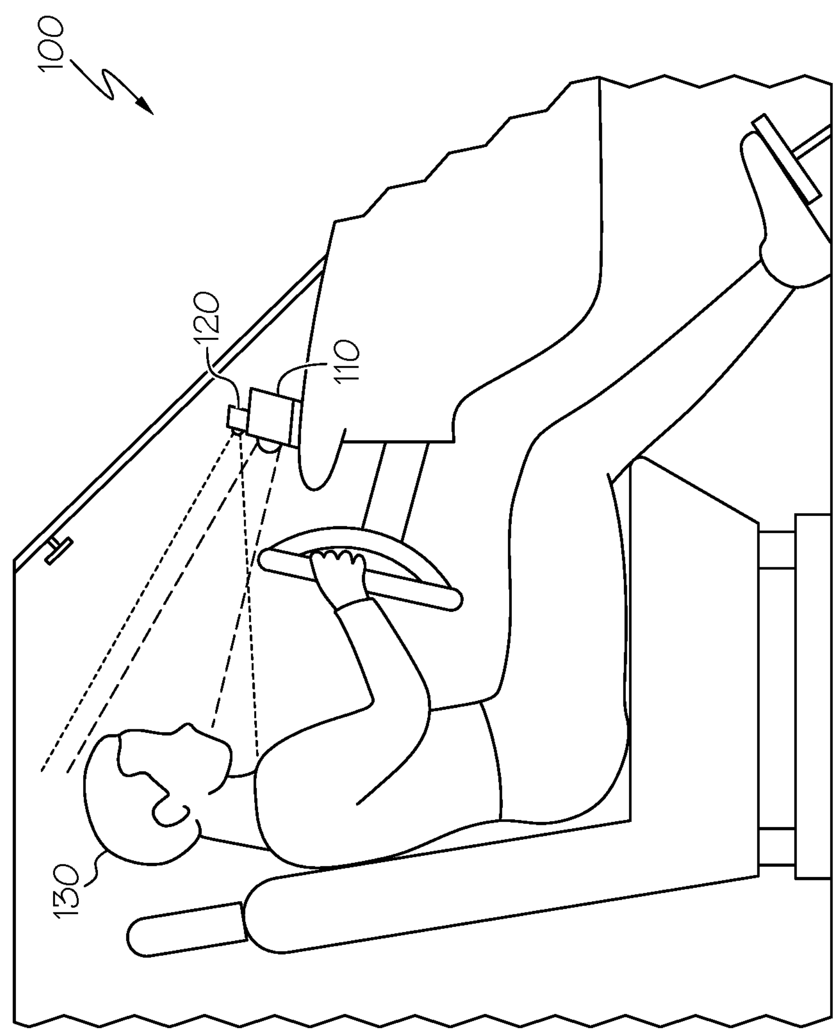
FIG. 1 depicts an illustrative example of a gesture or gaze detection configuration for a driver of a vehicle according to one or more embodiments shown and described herein.

Turning now to the drawings wherein like numbers refer to like structures, and particularly to FIG. 1, an illustrative example of a gesture or gaze detection system configuration for a driver 130 of a vehicle 100 is depicted. Gaze and gesture detection systems are useful for vehicle systems. A user authentication system is one example of a system that utilizes gaze and/or gesture detection systems. For example, an image acquisition module for acquiring a gesture input may be utilized to input a password to unlock a vehicle. The method may include receiving a gesture input password and obtaining a preset gesture password. The received gesture password is compared with the preset gesture password and when the received gesture password and the preset gesture match, the vehicle is unlocked.

Unlike existing gaze and gesture detection systems, the present disclosure utilizes gaze and/or gesture inputs to confirm a driver is aware of various features or events within an environment of a vehicle prior to initially providing or returning control of a vehicle over to the driver. Additionally, the present systems and methods may be utilized to determine whether the driver is intoxicated, drowsy, or otherwise incapacitated and unable to receive control of the vehicle. Systems and methods of the present disclosure may include an imaging device 110 configured to face a driver 130 and capture gaze and gesture inputs from the driver 130. Gaze and gesture systems may include infrared illumination sources 120 to generate rich reflections off an eye or other features of the driver for capture by the imaging device 110. The combination of infrared illumination sources 120 and imaging devices 110 may enable detailed eye-tracking systems capable of determining eye movement, pupil dilation, gaze direction, or the like.

As described in more detail herein, autonomous systems such as those which allow a driver to remove their eyes from the road during automated driving control may include various sensors and systems that monitor an environment around the vehicle. Such systems, for example and without limitation, are capable of tracking and identifying objects such as other vehicles, pedestrians, or the like. While the eyes of a driver are removed from the road, for example, during autonomous control of the vehicle, a driver may become less aware of the features or events occurring in the environment around the traveling vehicle. Similarly, autonomous systems may process and generate information about an environment faster and in more detail than a driver who has just arrived at a vehicle. For example, vehicle systems upon start up may quickly obtain the location and trajectories of pedestrians, other vehicles or objects in the environment of a vehicle. In some situations, this information may be used to provide an alert or warning to a driver to use caution when proceeding to maneuver the vehicle. However, as described in more detail herein, a controller may not provide control of the vehicle to a driver until the driver acknowledges one or more features or events defined in a gaze pattern by their location within the environment of the vehicle. For example, through gazing in the direction of a potential hazard such as a pedestrian walking behind the vehicle in a parking lot, the controller may register that the driver is aware of at least the pedestrian and may increase a confidence level with respect to whether the driver is ready to assume control of the vehicle.

Figure 2:
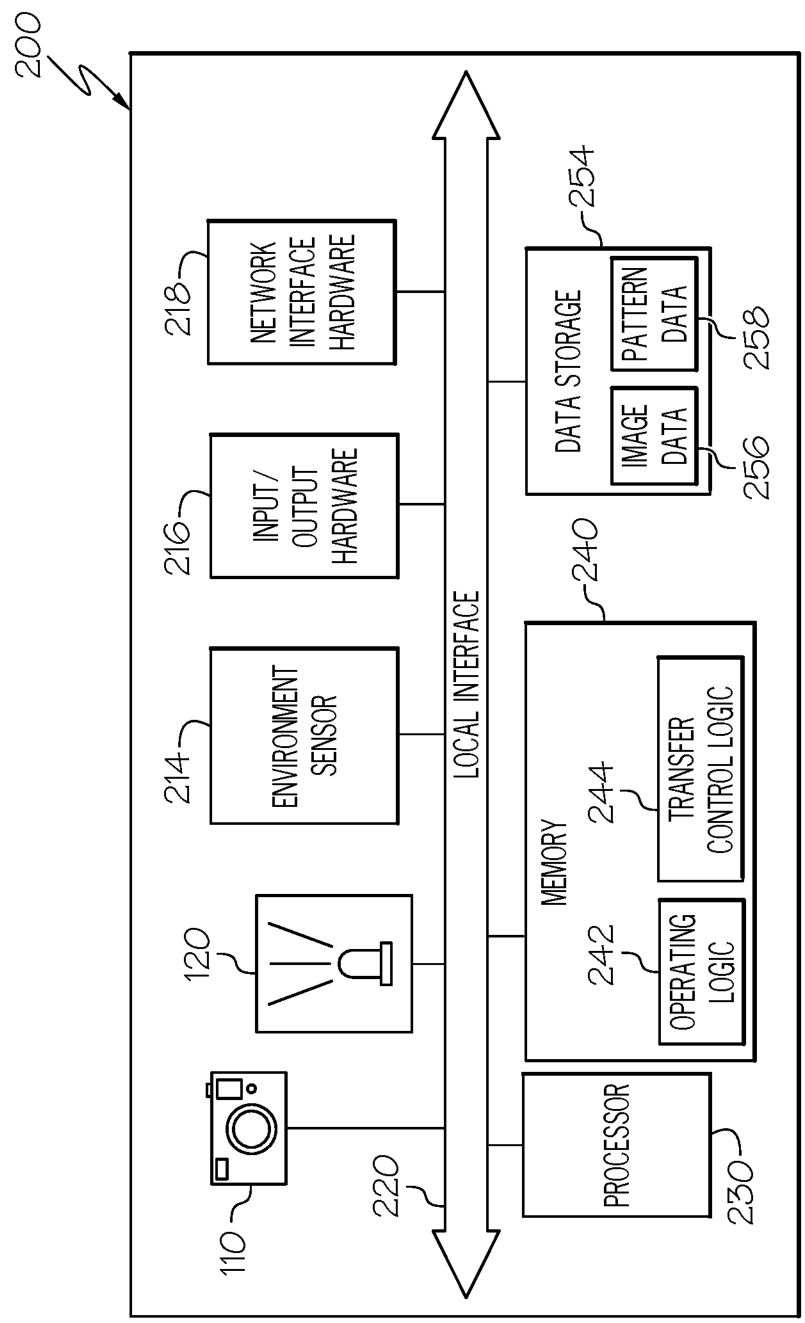
FIG. 2 schematically depicts components of a system for verifying the readiness of a driver and handing off control of a vehicle to the driver according to one or more embodiments shown and described herein.

Referring now to FIG. 2, an example schematic of components of a system 200 for verifying the readiness of a driver and handing off control of a vehicle to the driver is depicted. The system 200 may be configured within a vehicle for detecting a gaze or gesture input of a driver, determining that a driver is aware of features or events within an environment, and handing off control of the vehicle to the driver when the driver's awareness is confirmed. The system 200 may include an imaging device 110, an infrared illumination source 120, one or more environment sensors 214, input/output hardware 216, network interface hardware 218, a processor 230, a memory component 240, and a data storage component 254. These and other components of the system 200 may be communicatively connected to each other via a local interface 220. The local interface 220 may be implemented as a bus or other interface to facilitate communication among the components of the system 200.

The system 200 may include one or more imaging devices 110 communicatively coupled to the controller (e.g., the processor 230 and the memory component 240) via the local interface 220. The imaging device 110 may be a component of the vehicle configured for use by one or more vehicle systems. For example, a first imaging device may be implemented for gaze and/or gesture detection and input. A second imaging device may be implemented and utilized by an autonomous system for monitoring and collecting image data of an environment around a vehicle. The imaging device 110 may be any device having an array of sensing devices (e.g., a CCD array or active pixel sensors) capable of detecting radiation in an ultraviolet wavelength band, a visible light wavelength band, and/or an infrared wavelength band. The imaging device 110 may have any resolution. The imaging device 110 may be an omni-direction camera or a panoramic camera. In some embodiments, one or more optical components, such as a mirror, fish-eye lens, or any other type of lens may be optically coupled to the imaging device 110.

The system 200 may also include an infrared illumination source 120. The infrared illumination source 120 may be communicatively coupled to the controller (e.g., the processor 230 and the memory component 240) via the local interface 220. In some embodiments, the infrared illumination source 120 and the imaging device may be a single device. The infrared illumination source 120 may include one or more infrared emitters, driver circuitry and other hardware for controlling the activation and/or intensity of the infrared illumination source 120. Infrared light, also known as infrared radiation is a type of electromagnetic (EM) radiation like visible light, but infrared light is generally invisible to the human eye. EM radiation is transmitted in waves or particles across a range of wavelengths and frequencies. Infrared light waves are longer than those of visible light, just beyond the red end of the visible spectrum. An infrared illumination source 120 emits infrared light in the range of the (EM) spectrum between microwaves and visible light. Infrared light has frequencies from about 300 GHz up to about 400 THz and wavelengths of about 1 millimeter to 740 nanometers, although these values are not absolute. The spectrum of infrared light can be described in sub-divisions based on wavelength and frequency. For example, near-infrared may have a frequency of about 214 THz to about 400 THz and a wavelength to about 1400 nanometers of about 740 nanometers and far-infrared may have a frequency of about 300 GHz to about 20 THz and a wavelength of about 1 millimeter to about 15 micrometers. Infrared light may be subdivided into further divisions. Although only one infrared illumination source 120 is depicted in FIG. 2, it should be understood that two or more infrared illumination sources 120 may be positioned throughout a vehicle cabin to provide infrared light within the cabin for gaze direction and/or gesture detection systems.

The system 200 may also include one or more environment sensors 214 communicatively coupled to the controller (e.g., the processor 230 and the memory component 240) via the local interface 220. The one or more environment sensors 214 may be one of a variety of sensors capable of generating one or more signals indicative of an environment around the vehicle. For example, the one or more environment sensors 214 may be sensors utilized by an autonomous driving system. The one or more environment sensors 214 may include an imaging device 110, a LIDAR system, a navigation system such as a global positioning system GPS, or similar systems and sensors.

The system 200 may also include input/output hardware 216 and network interface hardware 218 communicatively coupled to the controller (e.g., the processor 230 and the memory component 240) via the local interface 220. The input/output hardware 216 may include a monitor, keyboard, mouse, printer, camera, microphone, speaker, and/or other device for receiving, sending, and/or presenting information. The network interface hardware 218 may include any wired or wireless networking hardware, such as a modem, LAN port, Wi-Fi card, WiMax card, mobile communications hardware, and/or other hardware for communicating with a network and/or other devices and systems.

As referred to herein, a "controller" of the system 200 may include a processor 230 and memory component 240. The processor 230 may include any processing component (s) configured to receive and execute programming instructions (such as from the data storage component 254 and/or the memory component 240). The processor 230 may be an electric controller, an integrated circuit, a microchip, a computer, or any other computing device. The processor 230 is communicatively coupled to the other components of the system 200 through the local interface 220 and/or the network interface hardware 218. Accordingly, the local interface 220 may communicatively couple any number of processors 230 with one another, and allow the components coupled to the local interface 220 to operate in a distributed computing environment. Specifically, each of the components may operate as a node that may send and/or receive data. Furthermore, while the embodiment depicted in FIG. 2 includes a single processor 230, some embodiments may include more than one processor 230.

The memory component 240 may be machine-readable memory (which may also be referred to herein as a non-transitory processor readable memory or memory). The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242 and transfer control logic 244, each of which may be embodied as a computer program, firmware, or hardware, as an example, and will be described in more detail herein.

Figure 5:
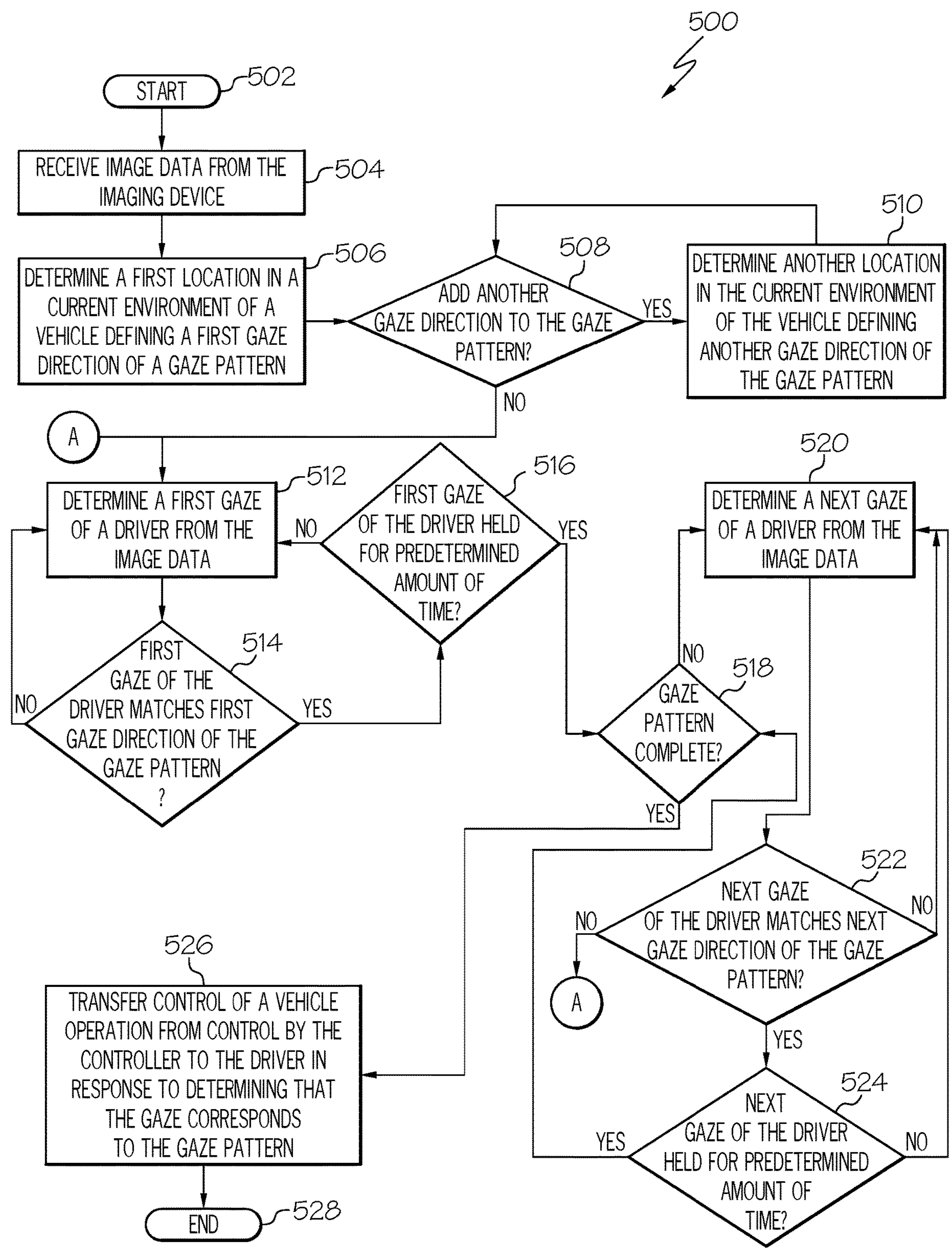
FIG. 5 depicts a flowchart of another example method for verifying the readiness of a driver and handing off control of a vehicle to the driver according to one or more embodiments shown and described herein.

The operating logic 242 may include an operating system and/or other software for managing components of the system 200. The transfer control logic 244 may include logic specific to carrying out functions of the system 200. For example, the flowcharts of FIGS. 3 and 5 provide examples of transfer control logic 244, which may be codified into a machine-readable instruction set (also referred to as programing instructions) for execution by the processor 230 of the controller of the system 200.

Still referring to FIG. 2, the data storage component 254 may be a volatile and/or nonvolatile digital storage component and, as such, may include random access memory (including SRAM, DRAM, and/or other types of random access memory), flash memory, registers, compact discs (CD), digital versatile discs (DVD), and/or other types of storage components. The data storage component 254 may reside local to and/or remote from the system 200 and may be configured to store one or more pieces of data (e.g., image data 256 and pattern data 258) for access by the system 200 and/or other components.

As illustrated in FIG. 2, the data storage component 254 stores, for example, image data 256 that is captured by the imaging device 210. In some embodiments, the image data 256 that is captured by the imaging device 210 may be transmitted through a network to a data storage component 254 that is located at a remote location from the system 200. Additionally, pattern data 258 may be stored in the data storage component 254. The pattern data 258 may include gaze direction patterns, gesture control patterns, or a combination of both which are defined by the vehicle based on the environment of the vehicle. The pattern data 258 may define a gaze direction that a driver should execute and the system 200 should observe to confirm that the gaze was executed by the driver before control of the vehicle is transferred to the driver.

Figure 3:
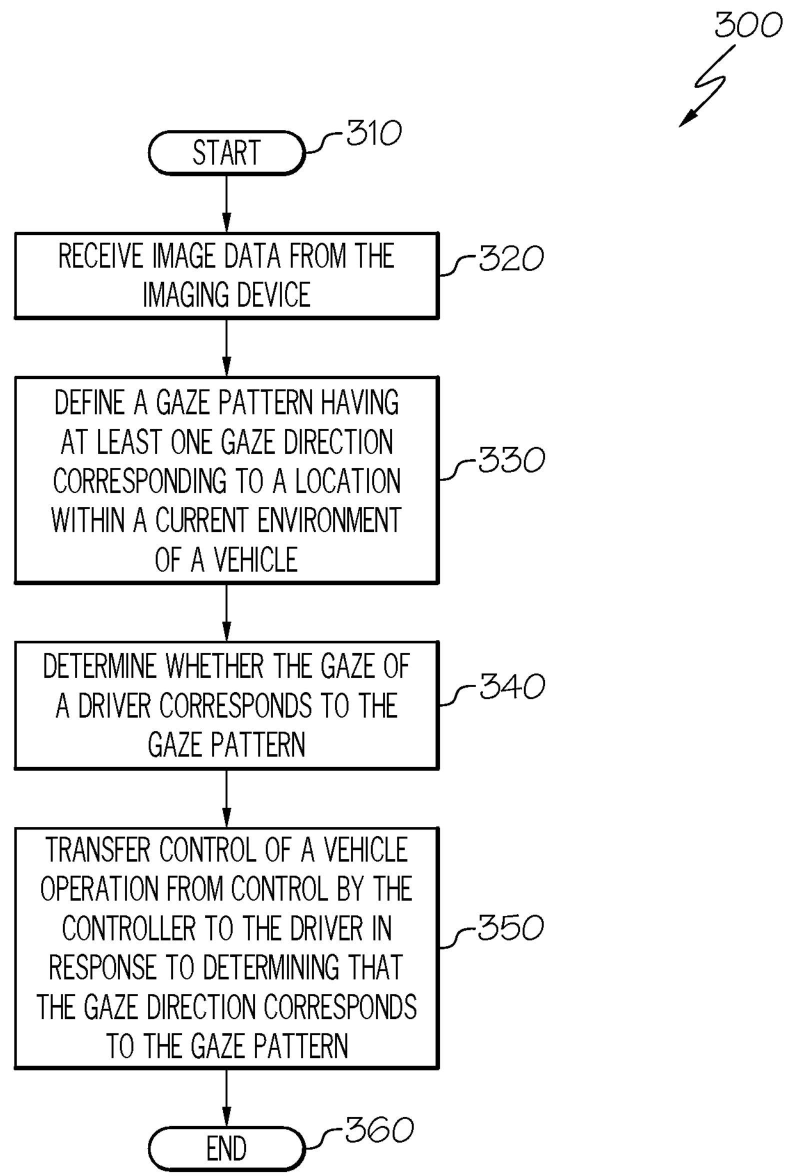
FIG. 3 depicts a flowchart of an example method for verifying the readiness of a driver and handing off control of a vehicle to the driver according to one or more embodiments shown and described herein.

Turning now to FIG. 3, a flowchart 300 of an example method for verifying the readiness of a driver and handing off control of a vehicle to the driver is depicted. A controller may initialize the method depicted in flowchart 300 at block 310 upon ignition of the vehicle or when control is to be transferred to the driver. As described above, an autonomous vehicle may include numerous vehicle sensors including one or more imaging devices capable of capturing image data of an environment around a vehicle. Additionally, one or more imaging devices may be positioned within the vehicle for capturing image data of the driver in order to track gaze directions and/or receive gesture inputs. At block 320, the controller may receive image data from the imaging device. The controller may also receive one or more signals from the one or more environment sensors indicating features and/or events within the environment of the vehicle. At block 330, the controller may define a gaze pattern having at least one gaze direction corresponding to a location within a current environment of the vehicle. For example, the controller may analyze image data or LIDAR data of a current environment of a vehicle obtained from one or more environment sensors and identify one or more locations that a driver should be aware of prior to receiving control of the vehicle. For example, a vehicle may be stopped at a stop light after exiting the highway where autonomous control maneuvered the vehicle. Prior to handing off control of the vehicle back to the driver, the controller may identify the location of a stoplight as a location within the current environment that a driver's gaze should track to and the driver should acknowledge before receiving control of the vehicle. In such a case, the gaze pattern may include only one gaze direction, a gaze direction corresponding to the location of the stoplight. However, as will be described later, a gaze pattern may comprise one or more gaze directions.

By way of another example, an autonomous vehicle may assume control of a vehicle when the vehicle encounters traffic on the highway. However, once the traffic begins to break up then the vehicle controller may transfer control back to the driver. During such a transfer, the gaze pattern may include a gaze direction defined by a look down the road by the driver. Such a gaze direction may confirm the driver is aware of events and features in front of the vehicle before the controller returns control to the driver. Unlike a stop light in a city, a transfer of control on the highway from traffic to no traffic situation may include fewer events and/or features that a driver should be aware of before assuming control. For example, there is generally no cross-traffic on a highway, unlike a city street at a stoplight.

At block 340, the controller, may determine whether the gaze direction of a driver corresponds to the gaze pattern. In some embodiments, the gaze direction of the driver may be determined using eye-tracking algorithms applied to image data acquired by an imaging device of a driver. At block 350, the controller may transfer control of a vehicle operation from control by the controller to the driver in response to determining that the gaze direction corresponds to the gaze pattern. For example, if the controller determines that the driver has gazed at the stoplight, then the controller may transfer control of the vehicle from autonomous control to the driver. The controller may then end the method of verifying control handback at block 360.

While the aforementioned flowchart 300 was described with respect to gaze directions, it should also be understood that gestures may also provide the necessary input for the controller of the system to determine that the driver is aware of an event or feature (i.e., a location within an environment of the vehicle). For example, if a driver makes a pointing gesture in the direction of a location within the current environment that the controller has identified as an area of interest that a driver should be aware of prior to receiving control of the vehicle and the controller detects the gesture within the image data, then the controller may increase the level of confidence that a driver is ready to receive control of the vehicle.

Figure 4:
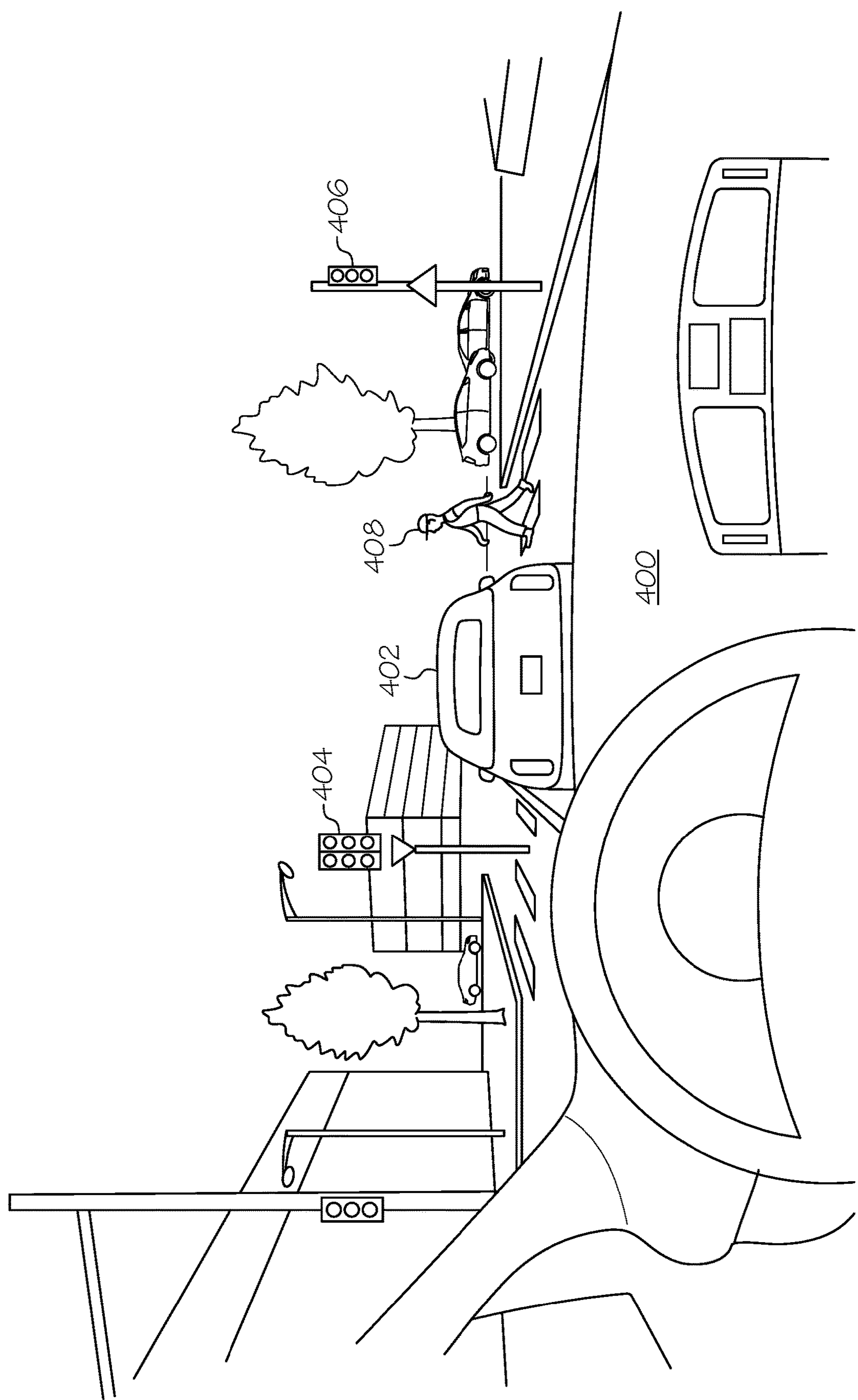
FIG. 4 depicts an illustrative environment of a vehicle during the handoff of control between an autonomous mode and a human driver according to one or more embodiments shown and described herein.

For further example and explanation, FIG. 4 provides an illustrative environment of a vehicle executing a method of handing off control of a vehicle to a human. FIG. 4 depicts vehicle 400 in an environment having a second vehicle 402 positioned in front of the vehicle 400 at an intersection having stoplights 404 and 406. The intersection also includes a crosswalk where pedestrian 408 is actively crossing the street. In some embodiments, each of these features, that is, the second vehicle 402, either or both stoplights 404 and 406, and the pedestrian 408 may be locations that the controller determines a driver needs to visually acknowledge through either a gaze or gesture action prior to transferring control of the vehicle to the driver. For example, a gaze direction corresponding to each of the locations may need to be determined by the controller. The order in which the locations are acknowledged may not be defined or important to determining that the driver is aware and/or ready to drive. However, the driver may be required to acknowledge each of the locations within an overall amount of time or may be required to gaze at each location for a predetermined amount of time.

For example, a controller may define a gaze pattern having a first location being the pedestrian 408 and a second location being the stoplight 404 or 406. The controller may further specify that the gaze pattern needs to be completed within 3 seconds. A time requirement may be required so that the controller can assure the currentness of an environment since elements of an environment can move before a driver gazes upon them or acknowledges them with a gesture. As described with respect to the flowchart 500 depicted in FIG. 5 below, if a predetermined amount of time lapses then a gaze direction may be invalid and the pattern may need to be repeated. In some embodiments, the controller may define an order to the locations that a driver needs to gaze or gestures towards. In some embodiments, the controller may configure the gaze pattern to prevent transfer of control of the vehicle to the driver should the driver be found gazing back toward a phone, book, or other distraction within the vehicle. Such an instance may indicate that the driver is not fully ready to engage in driving although the driver has acknowledged all or part of the locations defining the gaze pattern.

It should be understood that the locations that define the gaze pattern may not be auditorily or visually identified to the driver. However, in some embodiments, if control needs to be handed back to a driver and the driver has not acknowledged all of the locations defined by the controller as part of the gaze pattern, an alert may be provided to draw the driver's attention to the location.

Referring now to FIG. 5, a flowchart 500 of another example method for verifying the readiness of a driver and handing off control of a vehicle to the driver is depicted. A controller may initialize the method depicted in flowchart 500 at block 502 upon ignition of the vehicle or when control is to be transferred to the driver. As described above an autonomous vehicle may include numerous vehicle sensors including one or more imaging devices capable of capturing image data of an environment around a vehicle. Additionally, one or more imaging devices may be positioned within the vehicle for capturing image data of the driver in order to track gaze directions and/or receive gesture inputs. At block 504, the controller may receive image data from the imaging device. The controller may also receive one or more signals from the one or more environment sensors indicating features and/or events within the environment of the vehicle.

At block 506, the controller may determine a first location in a current environment of a vehicle defining a first gaze direction of a gaze pattern. The gaze pattern may include one or more gaze directions corresponding to one or more locations within an environment of the vehicle. The gaze pattern may remain valid for a predefined amount of time or until the location or environment of the vehicle changes. That is, since a transfer of control of a vehicle to a driver may take some time, the environment around the driver may change thus facilitating the need to update the gaze pattern. The controller may monitor the amount of time that has elapsed since establishing a gaze pattern and when the time elapses may update the gaze pattern with new locations. In some embodiments, the vehicle under autonomous control may be in motion while the controller confirms the readiness of the driver to receive control of the vehicle; therefore, the environment may change and therefore require new locations (i.e., new gaze directions) that define the gaze pattern.

At block 508, the controller determines whether an additional gaze direction to the gaze pattern needs to be added. For example, the controller may be programed to include all non-vehicle objects within the road as locations that the driver must gaze at prior to receiving control of the vehicle. That is, if there is a pedestrian, a cyclist, an animal or the like in the road, then they may be added as a location that the driver should be aware of and the controller should confirm awareness of by the driver prior to handing back control. In other words, if the driver recognizes that a dog, for example, is crossing the street then the driver is likely ready to receive control of the vehicle because seeing a dog in the street may be a detail that requires attention to notice. Similarly, a controller may define that a gaze in a particular direction, for example, down the street, for a predefined amount of time is required as a first gaze direction of the gaze pattern.

If another gaze direction is determined to be included in the gaze pattern, then at block 510 the controller may determine another location (e.g., a second location) in a current environment of a vehicle defining another (e.g., a second) gaze direction of the gaze pattern. It should be understood that first, second, next and the like do not necessarily define order to the gaze pattern. As discussed above, the gaze pattern may be order independent. That is, the gaze pattern may include a number of locations that need to be gazed upon, but a driver is not required to gaze upon each location of the gaze patter in a particular order.

Once the gaze pattern is defined by the controller, the controller may determine a first gaze of the driver from the image data at block 512. At block 514, the controller compares the first gaze with the gaze directions of the gaze pattern to determine whether the first gaze matches a first gaze direction of the gaze pattern. If the first gaze matches a location of the gaze pattern, then at block 516 the controller may determine whether the first gaze of the driver was held for a predetermined amount of time. In some embodiments, the predetermined amount of time may be defined by the controller based on the type of gaze or gesture action. For example, a gaze into the rear view mirror may include a predetermined amount of time of 1 or 2 seconds since objects in the rearview mirror may be small and require some additional time to focus on and recognize.

If the first gaze does not match a gaze direction of the gaze pattern, the controller may return to block 512 and obtain another gaze direction from the image data. Additionally, if at block 516 the first gaze is not held for the predetermined amount of time, the controller may invalidate the first gaze and return to block 512 and obtain another gaze direction from the image data. However, if the first gaze of the driver is held for the predetermined amount of time then the controller, at block 518, may determine whether the gaze pattern is complete. If the gaze pattern is not complete, then the controller proceeds to determine another gaze of the driver from the image data at block 520.

At block 522, the controller may then compare the next gaze with the gaze directions of the gaze pattern to determine whether the next gaze matches a gaze direction of the gaze pattern. If the next gaze does not match a gaze direction of the gaze pattern, the controller may return to block 512 or block 520 and obtain another gaze direction from the image data. In some embodiments, the driver may be required to restart the gaze pattern at block 512 in the event too much time had elapsed from the first gaze match of the gaze pattern.

If the next gaze matches a location of the gaze pattern, then at block 524 the controller may determine whether the next gaze of the driver was held for a predetermined amount of time. If the next gaze of the driver is held for the predetermined amount of time, then the controller, at block 518, may determine whether the gaze pattern is complete. However, if at block 524 the next gaze is not held for the predetermined amount of time, the controller may invalidate the next gaze and return to block 520 and obtain another gaze direction from the image data.

At block 518, if the gaze pattern is determined to have been completed, then the controller proceeds to block 526 and transfers control of the vehicle operation from control by the controller to the driver. The controller may then end the method of verifying control handback at block 528.

It should now be understood that embodiments described herein are directed to systems and methods for verifying the readiness of a driver and handing off control of a vehicle to the driver. A controller may obtain image data either in still images or as a continuous video feed of the environment around the vehicle and of the driver of the vehicle. The controller may determine locations within the environment, based on the image data and/or other vehicle sensors such as the one or more environment sensors, that a driver should gaze upon to verify the driver is ready and aware of the environment upon receiving control the vehicle. The controller may determine that a driver is ready and aware by comparing gaze directions and/or gestures with the defined locations making up the gaze pattern. In some embodiments, once a gaze pattern is determined to have been completed by the driver, within a predetermined amount of time, then the controller may transfer control of the vehicle to the driver.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle control handoff system comprising:

a controller comprising a processor;

one or more environment sensors communicatively coupled to the controller; and at least one imaging device communicatively coupled to the controller, wherein the controller is configured to:

receive image data of a driver from the at least one imaging device;

receive one or more signals corresponding to an environment of a vehicle from the one or more environment sensors;

define a gaze pattern comprising a first gaze direction corresponding to a first location within the environment of the vehicle and a second gaze direction corresponding to a second location within the environment;

determine a first gaze and a first pointing gesture based on the image data of the driver;

determine whether the first gaze corresponds to the first gaze direction of the gaze pattern;

determine whether the first pointing gesture corresponds to the first gaze direction of the gaze pattern;

determine a second gaze and a second pointing gesture based on the image data of the driver;

determine whether the second gaze corresponds to the second gaze direction;

determine whether the second pointing gesture corresponds to the second gaze direction of the gaze pattern; and transfer control of a vehicle operation from control by the controller to the driver in response to determining that the first gaze or the first pointing gesture corresponds to the first gaze direction of the gaze pattern and that the second gaze or the second pointing gesture corresponds to the second gaze direction of the gaze pattern.

2. The system of claim 1, wherein the controller is further configured to:

determine an elapsed time from the first gaze of the driver corresponding to the first location, wherein when the elapsed time is greater than a predefined amount of time, the gaze pattern is redefined.

3. The system of claim 1, wherein the gaze pattern includes a gaze upon a stoplight located in the environment of the vehicle.

4. The system of claim 1, wherein the gaze pattern is not predefined by the driver.

5. The system of claim 1, wherein controller is further configured to:

determine whether the first gaze of the driver is held for a predefined amount of time.

6. The system of claim 1, wherein the transfer of control includes a transfer from an autonomous driving mode to a human driving mode.

7. The system of claim 1, wherein the transfer of control includes a transfer from an autonomous driving mode to a human driving mode when the vehicle is stopped.

8. The system of claim 1, wherein the gaze pattern is order independent.

9. The system of claim 1, wherein the controller is further configured to:

update the gaze pattern in response to an elapsed amount of time or a change in the environment of the vehicle.

10. A method of vehicle control handoff, the method comprising, receiving image data of a driver from at least one imaging device;

receiving one or more signals corresponding to an environment of a vehicle from one or more environment sensors;

defining a gaze pattern comprising a first gaze direction corresponding to a first location within the environment of the vehicle and a second gaze direction corresponding to a second location within the environment based on the one or more signals;

determining a first gaze and a first pointing gesture based on the image data of the driver;

determining whether the first gaze corresponds to the first gaze direction of the gaze pattern;

determining whether the first pointing gesture corresponds to the first gaze direction of the gaze pattern;

determining a second gaze and a second pointing gesture based on the image data of the driver;

determining whether the second gaze corresponds to the second gaze direction;

determining whether the second pointing gesture corresponds to the second gaze direction of the gaze pattern; and transferring control of a vehicle operation from control by a controller to the driver in response to determining that the first gaze or the first pointing gesture corresponds to the first gaze direction of the gaze pattern and that the second gaze or the second pointing gesture corresponds to the second gaze direction of the gaze pattern.

11. The method of claim 10, further comprising:

determining an elapsed time from the first gaze of the driver corresponding to the first location, wherein when the elapsed time is greater than a predefined amount of time, the gaze pattern is redefined.

12. The method of claim 10, wherein the gaze pattern includes a gaze upon a stoplight located in the environment of the vehicle.

13. The method of claim 10, wherein the gaze pattern is not predefined by the driver.

14. The method of claim 10, further comprising:

determining whether the first gaze of the driver is held for a predefined amount of time.

15. The method of claim 10, wherein the transfer of control includes a transfer from an autonomous driving mode to a human driving mode.

16. The method of claim 10, wherein the transfer of control includes a transfer from an automated driving mode to a human driving mode when the vehicle is stopped.

17. The method of claim 10, wherein the gaze pattern is order independent.

18. The method of claim 10, further comprising:

updating the gaze pattern in response to an elapsed amount of time or a change in the environment of the vehicle.

* * * * *